(12) United States Patent
Tomita

(10) Patent No.: US 9,850,975 B2
(45) Date of Patent: Dec. 26, 2017

(54) DAMPER

(71) Applicant: NIFCO INC., Yokosuka-shi, Kanagawa (JP)

(72) Inventor: Shigemitsu Tomita, Yokosuka (JP)

(73) Assignee: NIFCO INC., Yokosuka-shi, Kanagawa (JP)

( * ) Notice: Subject to any disclaimer, the term of this patent is extended or adjusted under 35 U.S.C. 154(b) by 0 days.

(21) Appl. No.: 15/105,989

(22) PCT Filed: Dec. 17, 2014

(86) PCT No.: PCT/JP2014/083468
§ 371 (c)(1),
(2) Date: Jun. 17, 2016

(87) PCT Pub. No.: WO2015/093548
PCT Pub. Date: Jun. 25, 2015

(65) Prior Publication Data
US 2017/0002886 A1    Jan. 5, 2017

(30) Foreign Application Priority Data

Dec. 19, 2013    (JP) ................................ 2013-262149

(51) Int. Cl.
*F16F 11/00* (2006.01)
*F16F 9/02* (2006.01)
(Continued)

(52) U.S. Cl.
CPC .............. *F16F 9/0218* (2013.01); *F16F 7/09* (2013.01); *F16F 7/095* (2013.01); *F16F 9/3214* (2013.01); *F16F 9/3235* (2013.01); *F16F 9/368* (2013.01)

(58) Field of Classification Search
CPC .... F16F 7/08; F16F 7/082; F16F 7/085; F16F 7/09; F16F 7/095; F16F 2222/04; F16F 9/368; F16F 9/0227; F16F 9/0218
See application file for complete search history.

(56) References Cited

U.S. PATENT DOCUMENTS 4,110,868 A * 9/1978 Imazaike .................. E05F 5/10
16/66
5,070,971 A * 12/1991 Dourson ............... F16F 9/3214
188/317
(Continued)

FOREIGN PATENT DOCUMENTS

DE        20122569 U1    4/2006
EP        0841451 A2     5/1998
(Continued)

OTHER PUBLICATIONS

PCT International Search Report of PCT/JP2014/083468.
Europe Patent Office, "Search Report for European Patent Application No. 14870932.2," dated Sep. 8, 2017.

*Primary Examiner* — Nicholas J Lane
(74) *Attorney, Agent, or Firm* — Manabu Kanesaka

(57) ABSTRACT

A damper includes a piston provided with a rod, and a housing storing the piston, and generates a braking force by an operation of the piston. The piston is provided with a seal member relative to an inner wall of the housing; and a slider provided slidably relative to the piston, and contacting the inner wall of the housing with a predetermined frictional force. When the braking force is generated, the slider presses against the seal member, and a portion contacting the inner wall of the housing in the seal member deforms outwardly toward the housing.

9 Claims, 14 Drawing Sheets

(51) Int. Cl.
*F16F 7/09* (2006.01)
*F16F 9/32* (2006.01)
*F16F 9/36* (2006.01)

(56) References Cited

U.S. PATENT DOCUMENTS

| | | | | |
|---|---|---|---|---|
| 2002/0088677 A1* | 7/2002 | Fitz | ......................... | F16F 9/516 |
| | | | | 188/304 |
| 2005/0279596 A1* | 12/2005 | Gassner | .................... | E05F 5/02 |
| | | | | 188/282.8 |
| 2006/0118371 A1* | 6/2006 | Zimmer | ................... | F16F 7/09 |
| | | | | 188/280 |
| 2007/0175717 A1* | 8/2007 | Grabher | .................. | E05F 5/10 |
| | | | | 188/282.1 |
| 2008/0135363 A1* | 6/2008 | Tokumoto | ............. | F16F 9/3242 |
| | | | | 188/322.18 |
| 2009/0205485 A1* | 8/2009 | Zimmer | ................ | F16F 9/0218 |
| | | | | 92/8 |
| 2011/0024248 A1* | 2/2011 | Zimmer | ................... | F16F 7/09 |
| | | | | 188/322.16 |
| 2012/0091641 A1* | 4/2012 | Yang | ....................... | F16F 9/516 |
| | | | | 267/140.13 |
| 2012/0175830 A1* | 7/2012 | Yang | ...................... | F16F 9/516 |
| | | | | 267/140.13 |

FOREIGN PATENT DOCUMENTS

| | | | |
|---|---|---|---|
| EP | 1662168 A1 | 5/2006 | |
| EP | 1662170 A1 | 5/2006 | |
| JP | 2000-88028 A | 3/2000 | |
| JP | 3298002 B2 | 7/2002 | |
| JP | 2002-286076 A | 10/2002 | |
| WO | 2007/111016 A1 | 10/2007 | |

\* cited by examiner

DAMPER

FIELD OF TECHNOLOGY

The present invention relates to an improvement of a damper generating a braking force by an operation of a piston.

BACKGROUND ART

There is an air damper proposed to obtain a large output with a compact size, and comprising a cylinder main member provided with two cylinder portions in juxtaposition; and a piston main member formed by a piston rod moving inside the two cylinder portions respectively (see Patent Document 1).

The air damper of the Patent Document 1 covers the whole braking force by a resistance due to a pressure change. In such a case, when the piston rod starts to move, the braking force is small, and when the operation advances, the braking force rapidly increases. Consequently, in such a method, in some cases, there may be caused situations wherein a braking object halts in a process of a movement, and moreover, starts to unexpectedly move backward toward a position before the movement from a middle of the movement so as to be difficult to properly control the movement of the aforementioned braking object in a whole process thereof. Also, in the air damper of the Patent Document 1, the braking force thereof depends on a cross-sectional area of the cylinder main member so as to have a limit for reducing a size thereof.

PRIOR ART DOCUMENT

Patent Document

Patent Document 1: Japanese Patent No. 3298002

SUMMARY OF THE INVENTION

Problems to be Solved by the Invention

A main object of the present invention is to provide a damper which can properly control a movement of a braking object in a whole process thereof, and is suitable for reducing a size and thickness.

Means for Solving the Problems

In order to obtain the aforementioned object, in the first aspect of the present invention, a damper comprises a piston provided with a rod; and a housing storing the piston, and generates a braking force by an operation of the piston. The aforementioned piston is provided with a seal member relative to an inner wall of the housing; and a slider provided slidably relative to the piston, and contacting the inner wall of the housing with a predetermined frictional force, and when the braking force is generated, the slider presses against the seal member, and a portion contacting the inner wall of the housing in the seal member deforms outwardly toward the housing.

According to such a structure, a resistance due to a pressure changes by the operation of the piston, and a frictional resistance between the seal member and the housing generated by deforming the seal member by the slider as described above, can generate an intended braking force.

In one of preferred aspects of the present invention, the slider contacts the inner wall of the housing with a lip. Also, one of the preferred aspects of the present invention is that the slider is provided with a pressure contact portion pressed against the seal member from the rod side. Also, one of the preferred aspects of the present invention is that in accordance with an operation speed of the piston, a deformation amount of the seal member increases. Also, one of the preferred aspects of the present invention is that in accordance with the operation speed of the piston, a sliding amount of the slider increases.

Also, in order to obtain the aforementioned object, in the present invention from a second viewpoint, a damper comprises a piston provided with a rod; and a housing storing the piston, and generates a braking force by an operation of the piston. The piston is provided with a seal member relative to an inner wall of the housing, and a portion contacting the inner wall of the housing in the seal member deforms outwardly toward the housing when a chamber formed between the piston and a blocking end of the housing has a negative pressure.

According to such a structure, the resistance due to the pressure change by the operation of the piston, and the frictional resistance between the seal member and the housing generated by deforming the portion contacting the inner wall of the housing in the seal member as described above, can generate the intended braking force. In that case, furthermore, one of the preferred aspects is that in accordance with the operation speed of the piston, the deformation amount of the seal member increases.

Also, one of the preferred aspects of the present invention is that an outer frame shape in a cross section of the housing in a direction orthogonal to a moving direction of the piston forming each damper device described above is made flat.

Effect of the Invention

The damper according to the present invention can properly control a movement of an object to be braked in a whole process thereof, and is suitable for reducing a size and thickness as well. Also, the braking force of the damper according to the present invention is caused by a deformation of the seal member so as to simplify a structure thereof, and the damper according to the present invention includes a characteristic which can generate the intended braking force without paying any special attention to a size accuracy of each part of the structure.

BEST MODES OF CARRYING OUT THE INVENTION

Figure 1:
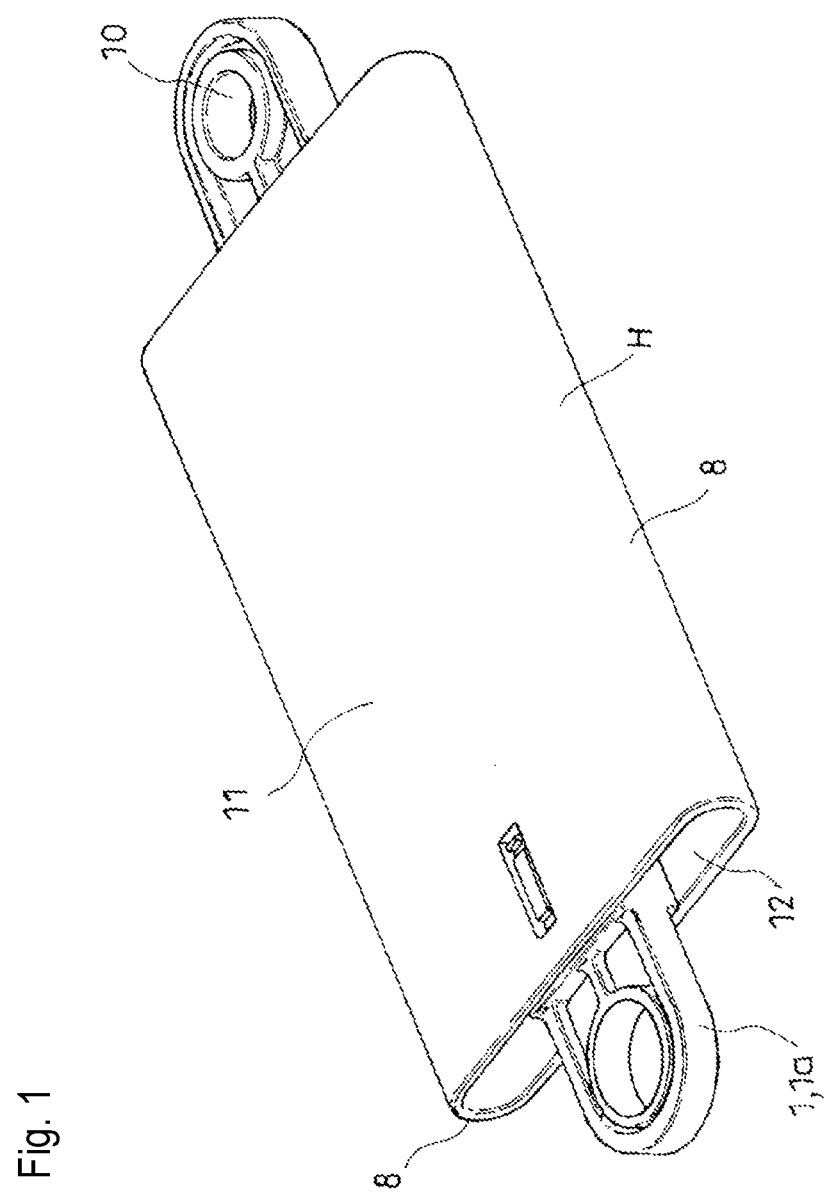
FIG. 1 is a perspective view of a damper (a first example) according to one embodiment of the present invention.
Figure 2:
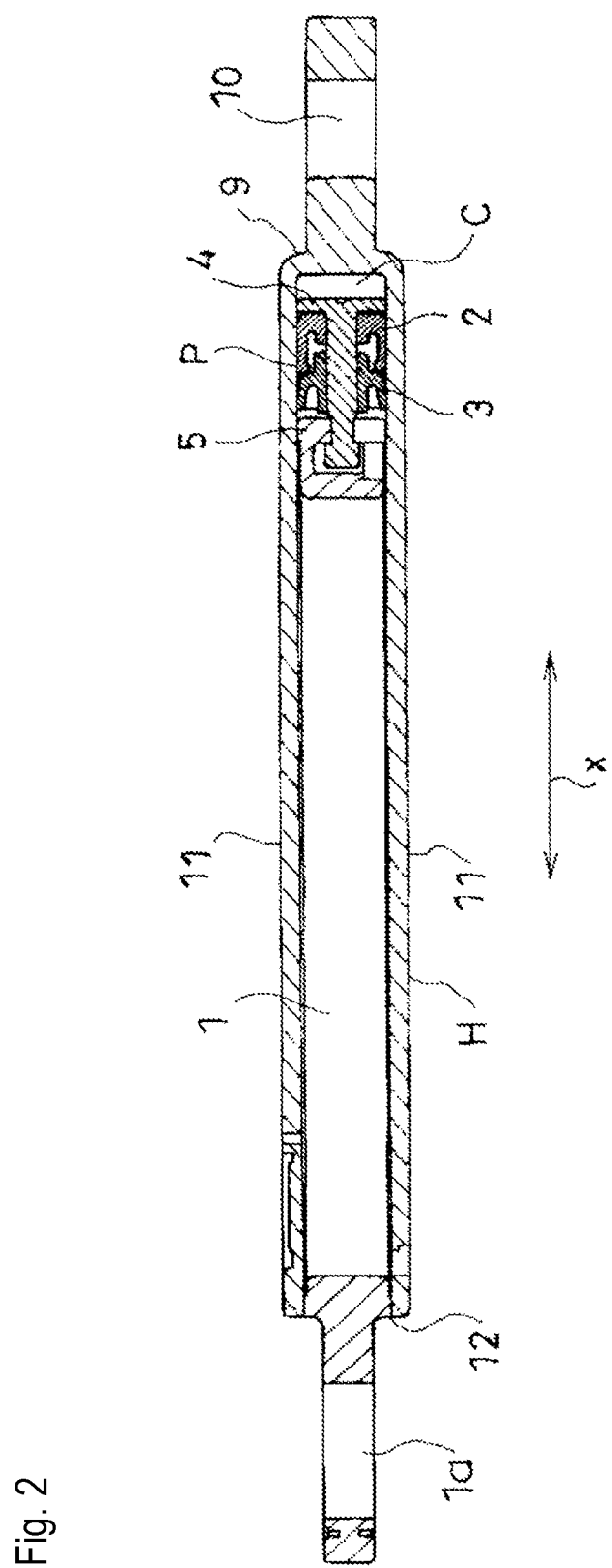
FIG. 2 is a cross-sectional structural view of the aforementioned first example.

Hereinafter, based on FIG. 1 to FIG. 14, typical embodiments of the present invention will be explained. A damper according to the embodiments generates a braking force for an operation of a piston P forming the damper, i.e. a movement or a relative movement of such piston P. Typically, the damper is combined with an article provided with a movable portion or the like (omitted in the drawings) which becomes an object to be braked, and used for applying the braking force relative to a movement of such object so as to move such object slowly and properly, with a feeling of a high quality, or prevent such braking object from moving extraordinarily.

Such damper comprises the piston P provided with a rod 1; and a housing H storing the piston P. Typically, such damper directly or indirectly links either one of the rod 1 or the housing H on the aforementioned braking object side, and directly or indirectly links the other of the rod 1 or the housing H on a side movably supporting such braking object so as to be combined with the article provided with such braking object.

The aforementioned housing H has a cylindrical shape opening one end and closing the other end. In illustrated examples, such housing H has a flat cylindrical shape wherein a thickness thereof is made notably small. More specifically, in the illustrated examples, in such housing H, a cross section orthogonal to a cylinder shaft thereof has substantially a rectangular shape. Side walls 8 forming a thickness side of the housing H have a shape with a curvature wherein the outside of the housing H becomes the outside of the curvature. Outside a blocking end 9 of the housing H, there is formed a bracket portion 10 for the aforementioned linking.

The aforementioned rod 1 has a long rod shape in a moving direction of the piston P. On one end positioned outside the housing H in the rod 1, there is formed a bracket portion 1a for the aforementioned linking.

The aforementioned piston P is provided with a seal member 2 relative to an inner wall of the housing H; and a slider 3 provided slidably relative to the piston P, and contacting the inner wall of the housing H with a predetermined frictional force.

In the illustrated examples, the piston P is provided with a first flange 4 facing the blocking end 9 of the housing H; and a second flange 5 retaining the seal member 2 and the slider 3 between the second flange 5 and the first flange 4. The second flange 5 is positioned at a back side of the first flange 4, i.e. on an open end 12 side of the housing H. In both the first flange 4 and the second flange 5, an outer frame shape in a cross section in a moving direction x (see FIG. 2) of the piston P, i.e. in a direction orthogonally in a direction along the cylinder shaft of the housing H, has a shape which becomes a complementary shape to an inner frame shape in the cross section of the housing H in the same direction. Thereby, the piston P is guided by the inner wall of the housing H so as to reciprocate in the direction along the cylinder shaft of the housing H.

Figure 3:
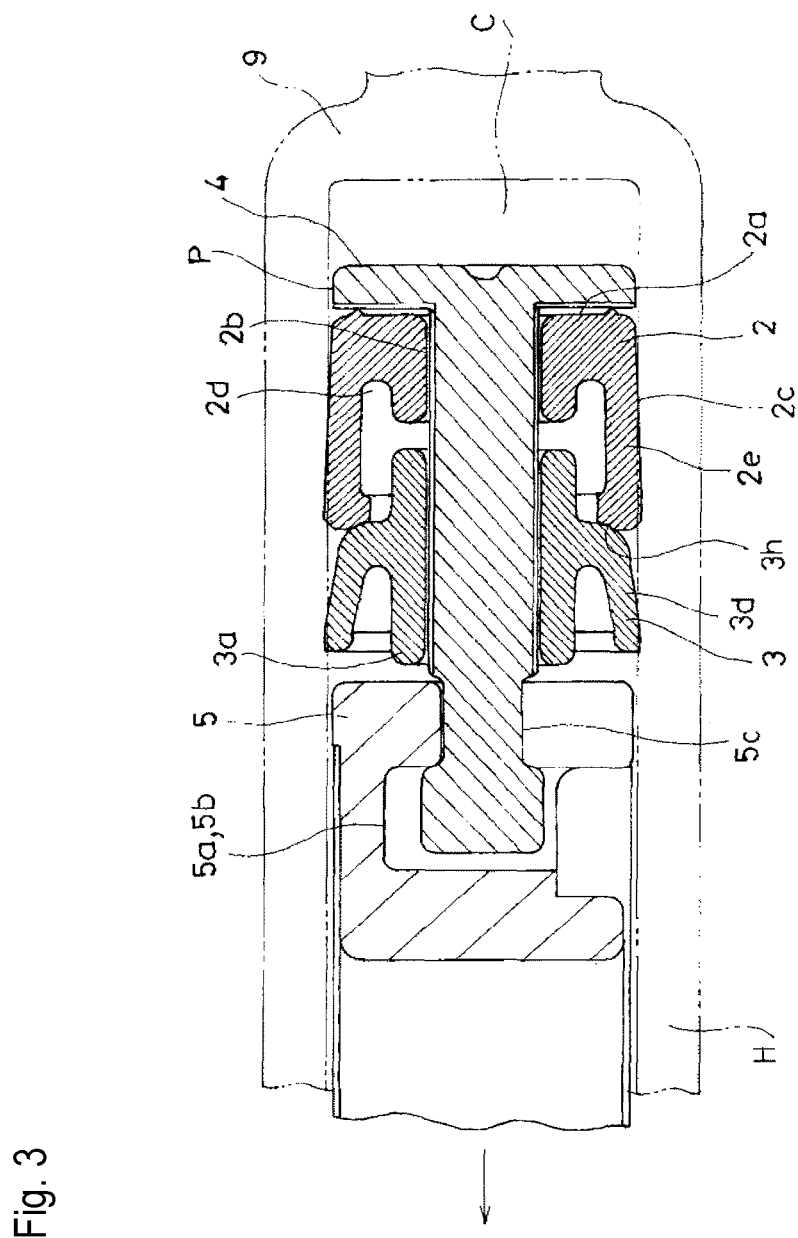
FIG. 3 is an enlarged cross-sectional structural view of essential parts of the first example, and shows a state when a piston moves forward.
Figure 4:
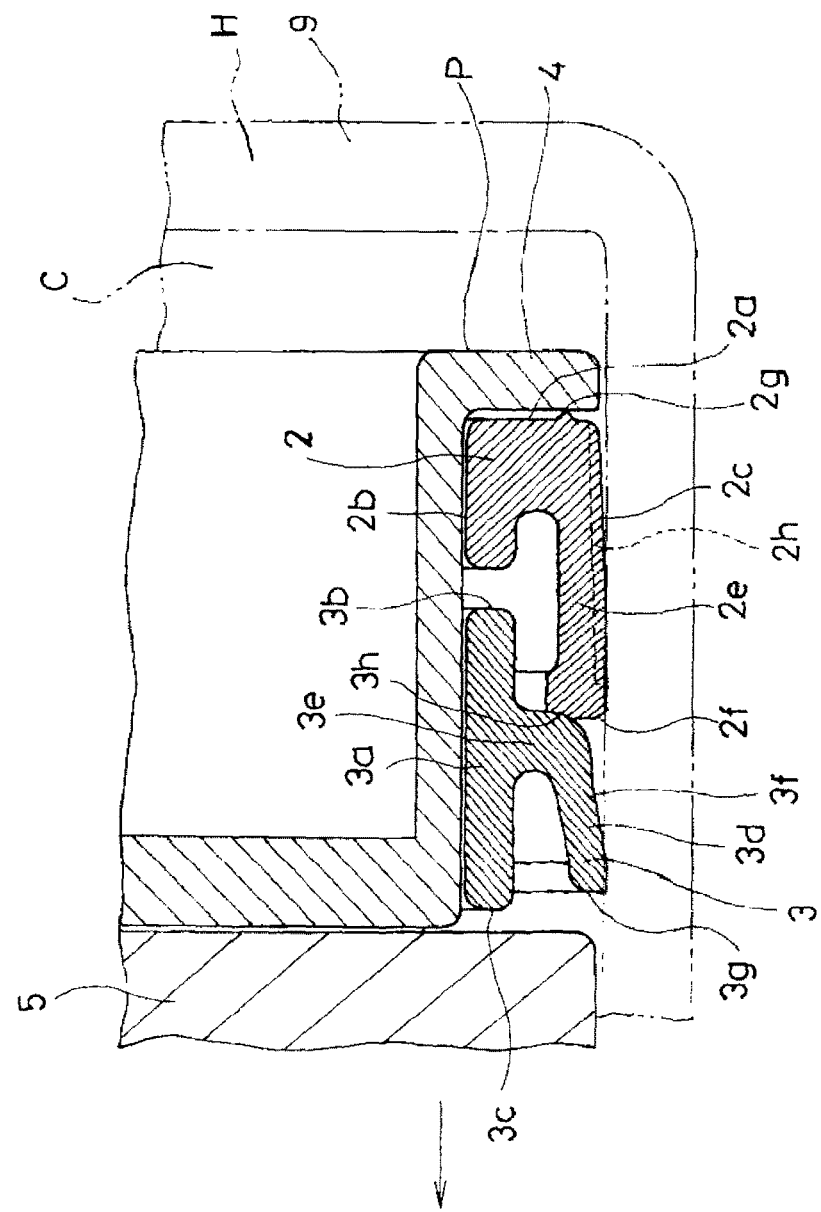
FIG. 4 is an enlarged cross-sectional structural view of the essential parts of the first example, and shows a state when the piston moves forward.
Figure 5:
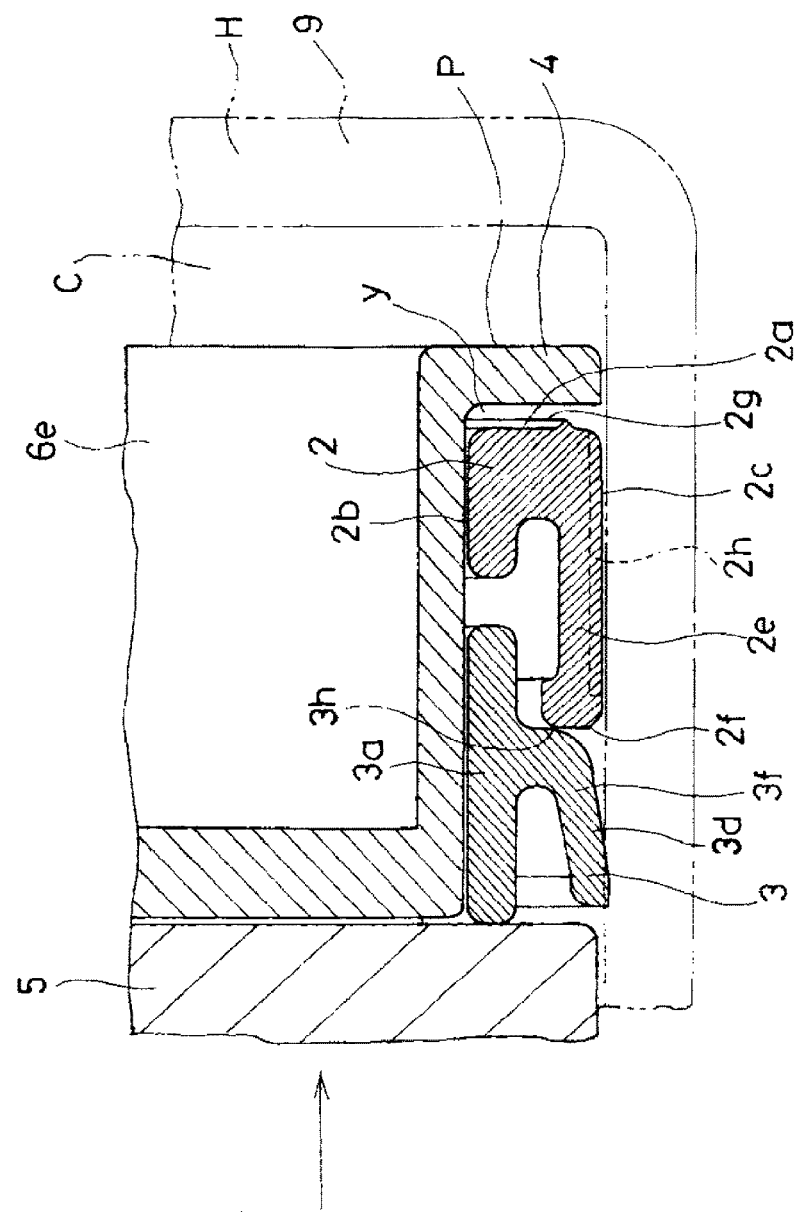
FIG. 5 is an enlarged cross-sectional structural view of the essential parts of the first example, and shows a state when the piston moves backward.
Figure 6:
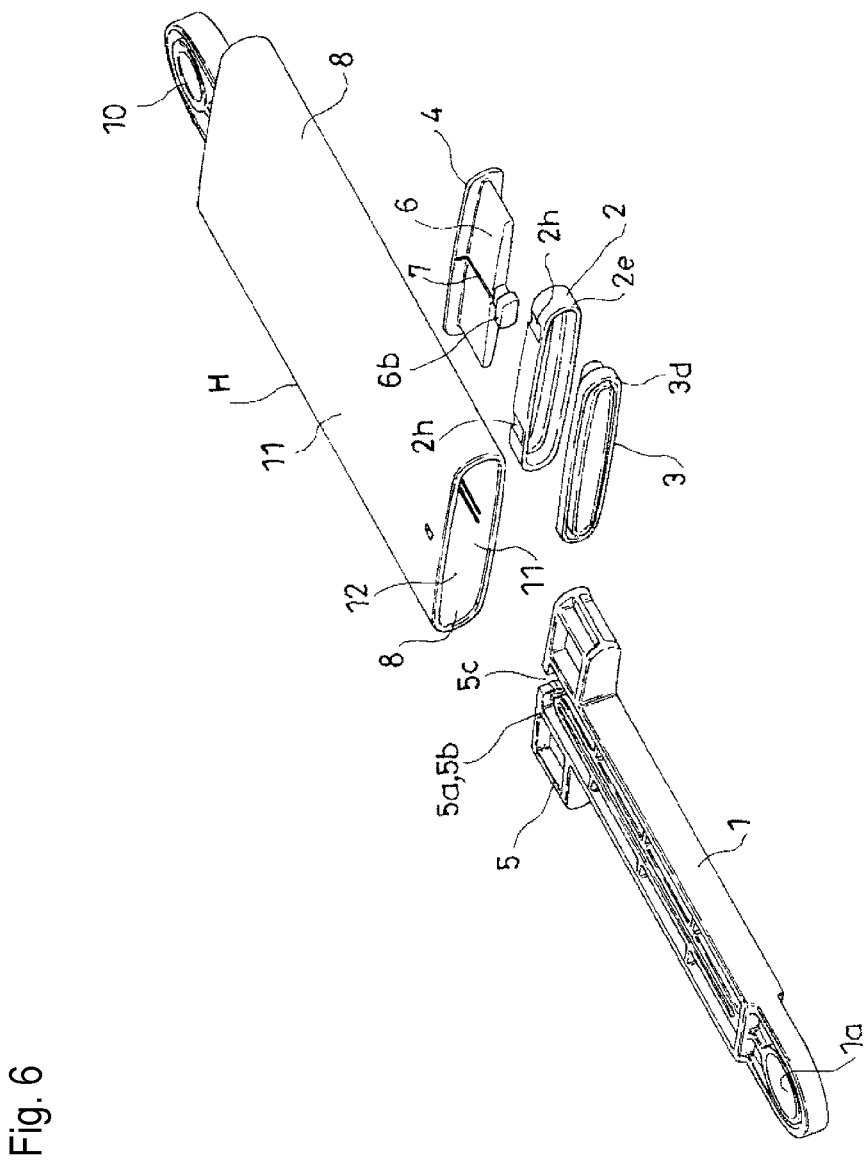
FIG. 6 is an exploded perspective view of the first example.
Figure 7:
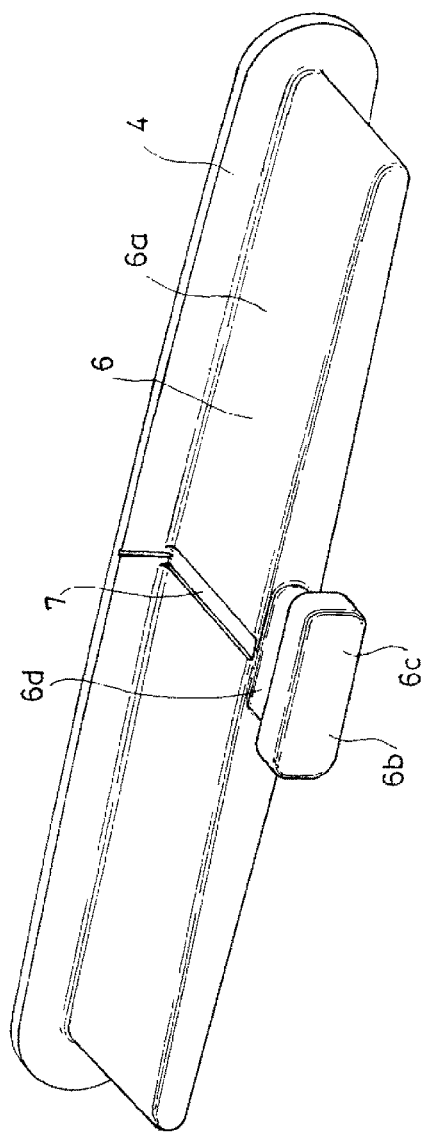
FIG. 7 is a perspective view of a head part forming the piston of the first example.
Figure 8:
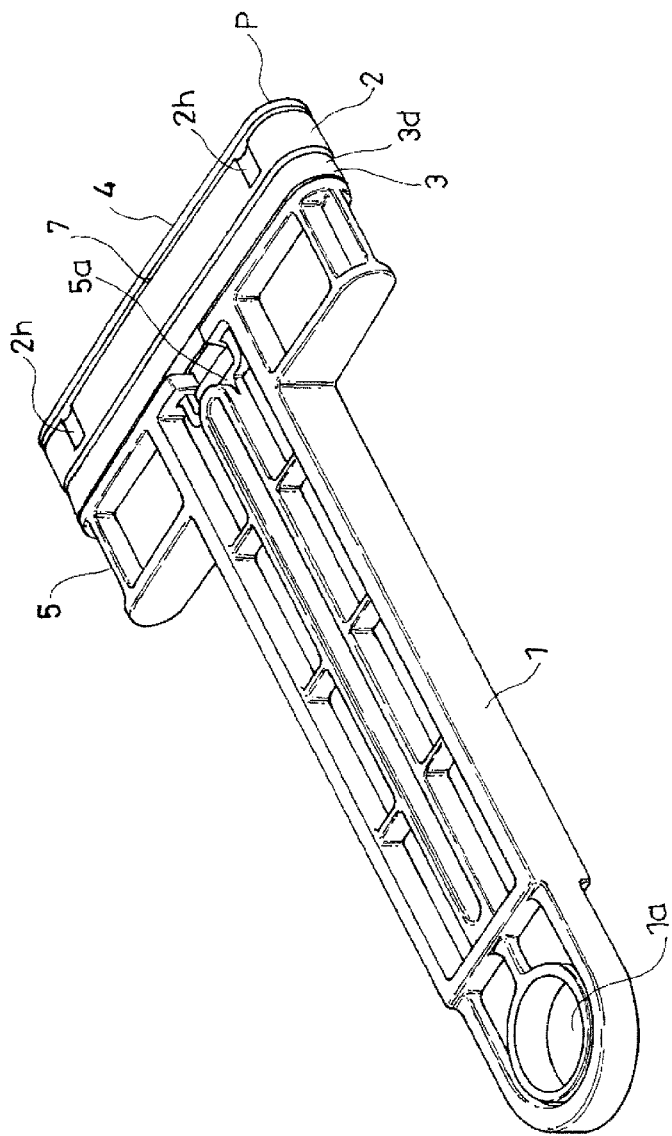
FIG. 8 is a perspective view of the piston of the first example.
Figure 9:
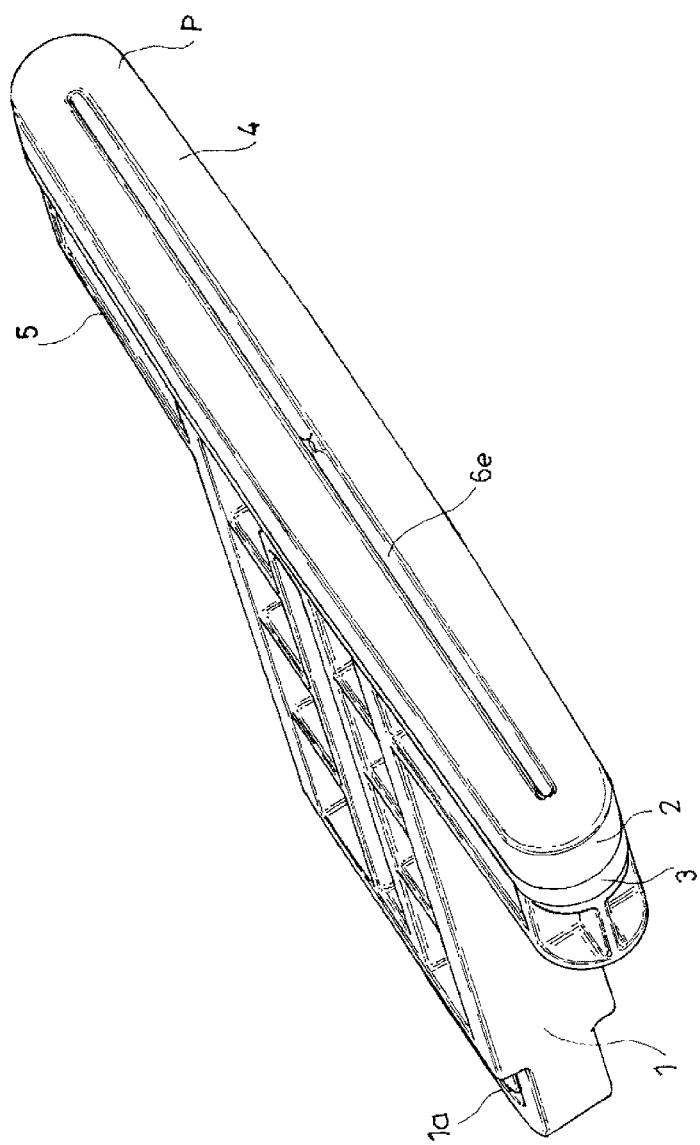
FIG. 9 is a perspective view of the piston of the first example, and shows such piston viewed from a right side in FIG. 8.

In the first example shown in FIG. 1 to FIG. 9, the second flange 5 is formed in the other end of the rod 1. The first flange 4 is formed in a head part 6 which is a separate member from the rod 1 (see FIGS. 6 and 7). The head part 6 includes a plate-like trunk portion 6a facing a plate face to the side walls on a width side of the housing H. On a side facing the blocking end 9 of the housing H in the trunk portion 6a, there is integrally formed the first flange 4 positioning a flange end outwardly more than an outer face of the trunk portion 6a at each position around the trunk portion 6a. Also, in a portion which is an end portion facing the open end 12 of the housing H in the trunk portion 6a, and positioned on the cylinder shaft of such housing H, there is formed a male joint portion 6b formed by a head portion 6c and a neck portion 6d, and integrated with the trunk portion 6a through the neck portion 6d. In a portion positioned on the cylinder shaft of the housing H in the second flange 5, there are formed a female joint portion 5a formed by a first concave portion 5b receiving and retaining the head portion 6c of the male joint portion 6b; and a second concave portion 5c receiving and retaining the neck portion 6c of the male joint portion 6b, and opening outwardly at an end portion facing the blocking end 9 of the housing H in the second flange 5 (see FIG. 6). In the first example, from a state wherein the seal member 2 and the slider 3 respectively having a flat ring shape are combined with the head part 6 in such a way as to surround the trunk portion 6a of the head part 6, the male joint portion 6b of the head part is fitted into the female joint portion 5a of the second flange 5 so as to form the piston P formed by retaining the seal member 2 and the slider 3 between such first flange 4 and second flange 5. Incidentally, the reference symbol 6e shown in FIG. 5 represents a cut-out portion inside the head part 6.

Typically, the seal member 2 is formed by rubber or plastic having a rubber-like elasticity, and has the flat ring shape. The truck portion 6a of the head part 6 is inserted to pass through the inside of the seal member 2 from a side of the male joint portion 6b so that such head part 6 and seal member 2 are combined. In the illustrated examples, the seal member 2 includes a front end face 2a relative to the first flange 4; an inner face 2b relative to an outer face of the head part 6; and an outer face 2c relative to the inner wall of the housing H (see FIG. 3). Also, on a side facing the open end 12 side of the housing H in the seal member 2, there is formed a circumferential groove 2d between the inner face 2b and the outer face 2c. An outer face side sandwiching the circumferential groove 2d extends toward the open end 12 side of the housing H throughout all circumferential directions of the seal member 2, so that the seal member 2 is provided with a skirt-shaped portion 2e, and the outer face 2c of the seal member 2 increases a size more than the inner face 2b in the moving direction x of the piston P. The outer face 2c of the seal member 2 inclines in a direction of gradually increasing a thickness of the seal member 2 as moving from the front end face 2a to a terminal 2f of the skirt-shaped portion 2e (see FIG. 4). Also, on the front end face 2a of the seal member 2, there is formed a circumferential projection piece 2g.

Typically, the slider 3 is formed by the plastic, and has the flat ring shape. As mentioned above, from a state wherein the head part 6 and the seal member 2 are combined, the trunk portion 6a of the head part 6 is inserted to pass through the inside of the slider 3 from the side of the male joint portion 6b, so that such head part 6 and slider 3 are combined. In the illustrated examples, the slider 3 is provided with a short cylindrical base 3a wherein an inner frame shape in a cross section orthogonally in the moving direction x of the piston P has a shape which becomes complementary to an outer frame shape in a cross section of the trunk portion 6a of the head part 6 in the same direction; and a lip 3d integrally formed outside the base 3a (see FIG. 3). In the illustrated examples, the lip 3d has a circumferential fin-like member formed in such a way as to surround the base 3a. The lip 3d has a base portion 3e integrated with an outer face portion of the base 3a between a front end 3b positioned on a seal member 2 side and a back end 3c positioned on the open end 12 side of the housing H in the base 3a, and is provided with an extension portion 3f extending toward the open end 12 side of the housing H from the base portion 3e (see FIG. 4). A shoulder portion 3h is formed between the base portion 3e and the extension portion 3f. The extension portion 3f has inclination gradually increasing a distance between the extension portion 3f and the base 3a as moving to a terminal 3g thereof from the shoulder portion 3h.

The seal member 2 and the slider 3 are held between the first flange 4 and the second flange 5 in a state allowing a slight movement along the moving direction x of the piston P. The outer face 2c of the seal member 2 contacts the inner wall of the housing H throughout a whole circumference thereof, and the extension portion 3f of the slider 3 contacts the inner wall of the housing H on a terminal 3g side thereof throughout a whole circumference thereof as well. Also, a portion located between the front end 3b of the base 3a of the slider 3 and the base portion 3e of the lip 3d is positioned inside the skirt-shaped portion 2e of the seal member 2, and the shoulder portion 3h of the lip 3d of the slider 3 faces the terminal 2f of the skirt-shaped portion 2e of the seal member 2 (FIG. 2 to FIG. 5).

Then, in the present embodiments, when the braking force is generated, the slider 3 presses the seal member 2, and a portion contacting the inner wall of the housing H in the seal member 2 deforms outwardly toward the housing H.

In the illustrated examples, when the piston P moves forward in a direction of separating from the blocking end 9 of the housing H, a chamber C formed between the piston P and the blocking end 9 comes to have a negative pressure, thereby generating a resistance due to a pressure change which becomes one portion of the braking force (FIG. 3 and FIG. 4). Also, at that time, the slider 3 deforms the seal member 2 as mentioned above to increase a frictional force between the seal member 2 and the housing H, thereby generating a frictional resistance which becomes one portion of the braking force (FIG. 3 and FIG. 4).

In the illustrated examples, when the piston P moves forward, the slider 3 becomes difficult to move in the forward-moving direction due to a shape of the lip 3d, so that the shoulder portion 3h of the slider 3 is pressed against the terminal 2f of the skirt-shaped portion 2e of the seal member 2, and the circumferential projection piece 2g formed in the front end face 2a of the seal member 2 is firmly attached to the first flange 4 so as to seal between the front end face 2a and the first flange 4, and the skirt-shaped portion 2e deforms outwardly so as to seal between the outer face 2c of the seal member 2 and the inner wall of the housing H (FIG. 3 and FIG. 4). Thereby, in the illustrated examples, when the piston P moves forward, ventilation relative to the chamber C is limited to a vent passage formed by a groove 7 (see FIG. 6 to FIG. 8) formed throughout the end portion facing the open end 12 of the housing H in the trunk portion 6a from an edge portion of the first flange 4 in a portion positioned on the cylinder shaft of the housing H in the head part 6 forming the piston P so as to generate the resistance due to the aforementioned pressure change. Also, the skirt-shaped portion 2e of the seal member 2 deforms outwardly as described above so as to generate the aforementioned frictional resistance. Namely, the slider 3 is provided with a pressure contact portion pressed against the seal member 2 from the rod 1 side, and in the illustrated examples, the shoulder portion 3h functions as the pressure contact portion.

In the present embodiments, in accordance with an operation speed of the piston P, a deformation amount of the seal member 2 increases. From another point of view, in accordance with the operation speed of the piston P, a sliding amount of the slider 3 increases. Therefore, the damper according to the embodiments is a damper with a speed response type changing the braking force in accordance with a moving speed of the braking object which becomes the braking object, or a load response type.

When all or most of the braking force is covered by the resistance due to the aforementioned pressure change, the braking force is small at the time of starting the piston operation, and when the operation of the piston advances, the braking force rapidly increases. Consequently, in such a method, in some cases, there may be caused situations wherein the braking object halts in a moving process, and moreover, starts to unexpectedly move backward toward a position before the movement from a middle of the movement so as to be difficult to properly control the movement of the aforementioned braking object in a whole process thereof.

On the other hand, in the damper according to the embodiments, the braking force is covered by the resistance due to the pressure change and the frictional resistance so as to properly control the movement of the braking object in the whole process thereof. Namely, the damper according to the embodiments can prevent the situations wherein the braking object halts in a forward moving process, and moreover, starts to unexpectedly move backward toward the position before the forward movement from a middle of the forward movement as much as possible. Also, the damper according to the embodiments can easily generate an intended braking force even if a cross-sectional area of the housing H is made small so as to have a characteristic which can easily reduce a size and thickness.

On the other hand, in the illustrated examples, when the piston P moves backward in a direction of approaching the blocking end 9 of the housing H, the chamber C is difficult to have a positive pressure, and at that time, the aforementioned frictional resistance becomes small as well (FIG. 5). In the illustrated examples, when the piston P moves backward, the seal member 2 and the slider 3 move to a second flange 5 side to form a gap y between the first flange 4 and the front end face 2a of the seal member 2, and due to the shape of the lip 3d, the slider 3 can easily move in a backward-moving direction of the piston P, so that the slider 3 is not pressed against the seal member 2, and the frictional resistance between the seal member 2 and the inner wall of the housing H does not increase as well. In addition to the vent passage formed by the groove 7, the chamber C is communicated through the gap y between the first flange 4 and the front end face 2a of the seal member 2 as well. Also, in the illustrated examples, on the outer face of the seal member 2, there is formed a groove 2h along the moving direction x of the piston P, and the groove 2h opens a groove end on a chamber C side, and closes a groove end on the open end 12 side of the housing H; however, when the piston P moves backward, due to a pressure increase on the chamber C side, at a position forming the groove 2h, one portion of the seal member 2 deforms inwardly, and exhaust ventilation can be carried out from the chamber C through the groove 2h as well. Thereby, in the illustrated examples, when the piston P moves backward, the damper is made so as not to generate a special braking force. Also, since the vent passage of the chamber C is expanded simultaneously when the piston P starts to move backward so as to prevent a situation wherein the braking object moves backward toward the position before the forward movement from the middle of the forward movement.

Figure 10:
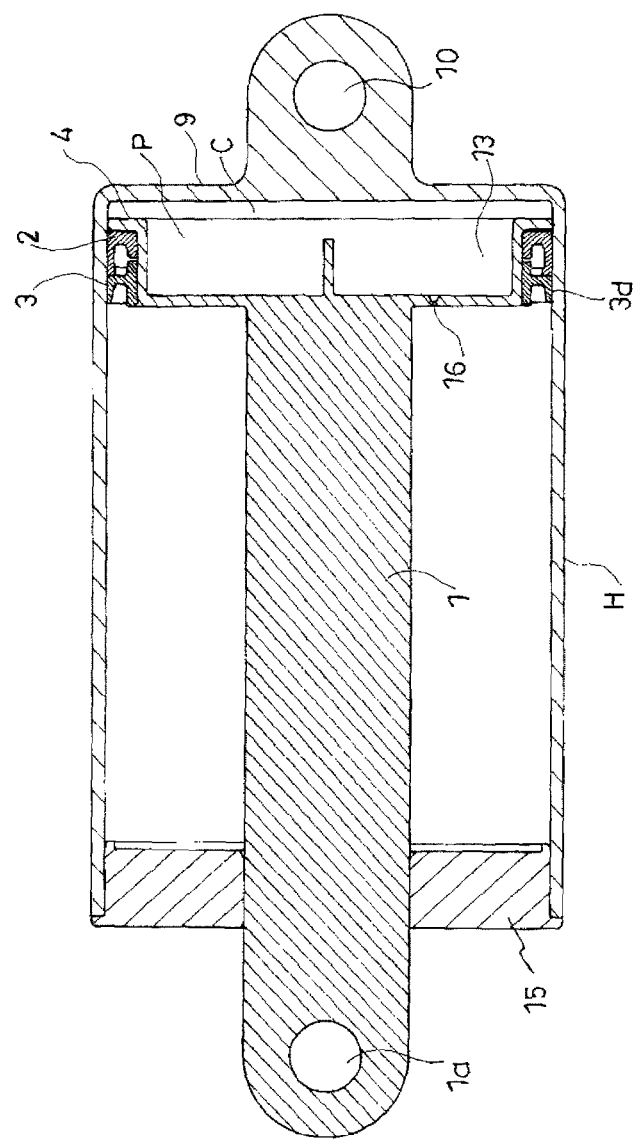
FIG. 10 is a cross-sectional view of the damper (a second example) according to another embodiment of the present invention.
Figure 11:
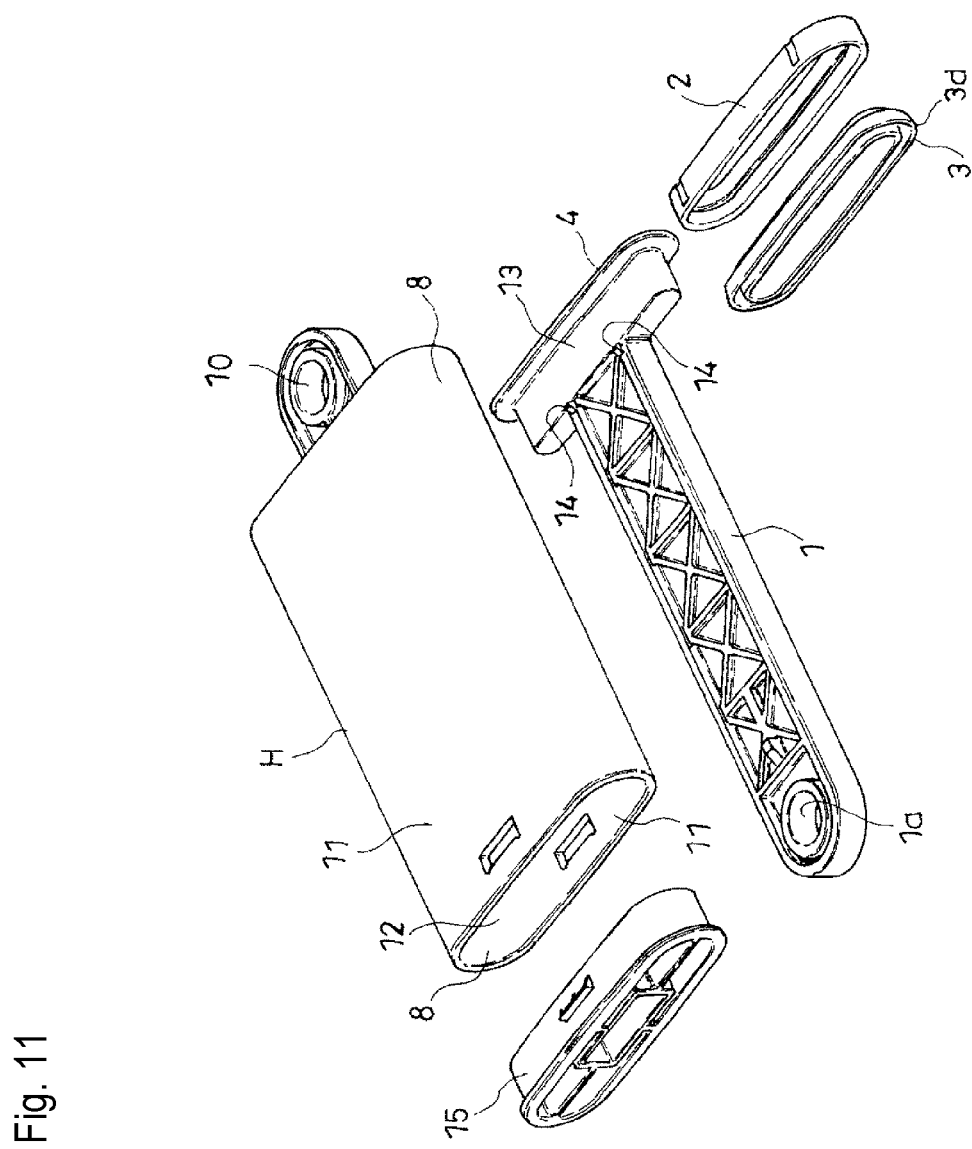
FIG. 11 is an exploded perspective view of the aforementioned second example.
Figure 12:
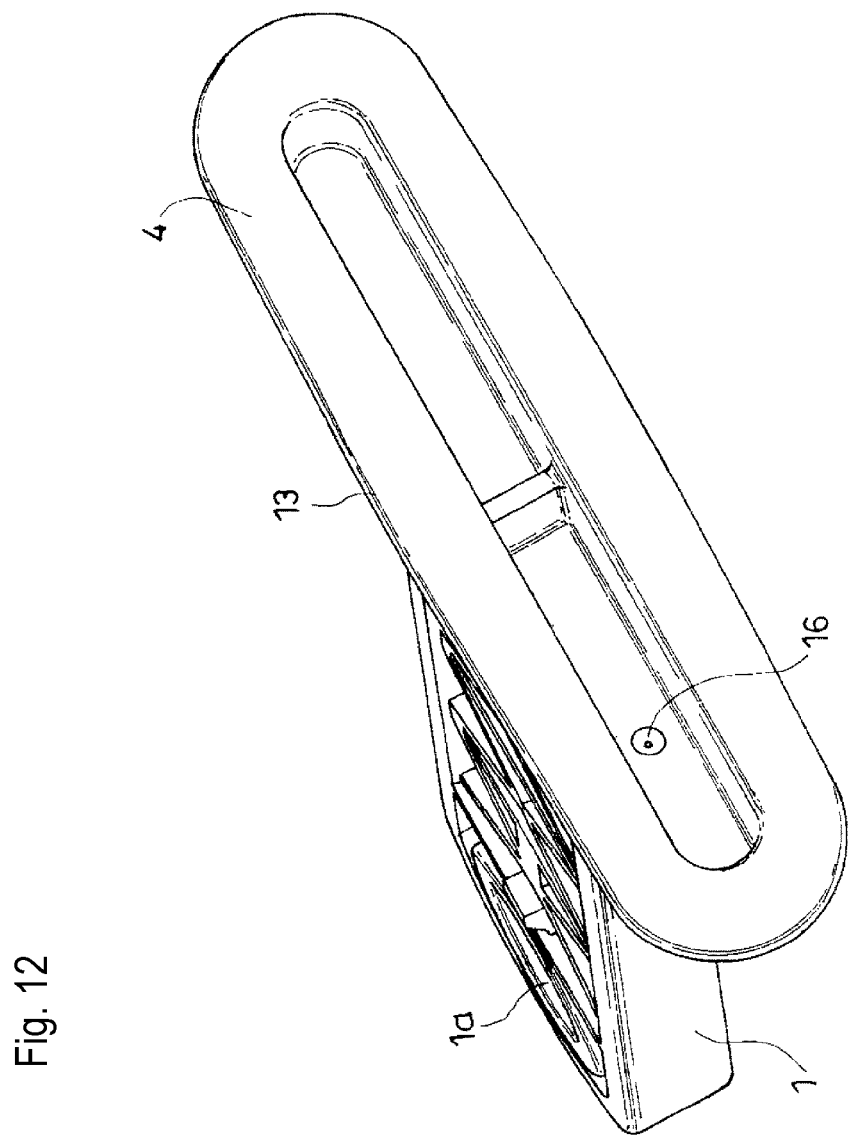
FIG. 12 is a perspective view of parts forming the piston of the second example.

In the damper of a second example shown in FIG. 10 to FIG. 12, thicknesses of the housing H and piston P are increased compared to the damper of the first example. The reference numeral 13 in the drawings represents a head corresponding to the head part 6 of the first example, and the head is integrated with the rod 1. The reference numeral 14 in the drawings represents claw portions functioning in the same manner as in the second flange 5 of the first example, and the reference numeral 15 represents a cap closing the open end 12 of the housing H. Also, in the damper of the second example, the vent passage always communicating the chamber C with the outside becomes an orifice 16 penetrating the head. The rest of the structural parts of the damper of the second example are substantially the same as those of the damper of the first example, so that regarding the same structural parts, symbols same as those used in FIG. 1 to FIG. 9 showing the damper of the first example are assigned to FIG. 10 to FIG. 12 showing the damper of the second example, and their explanations are omitted.

Figure 13:
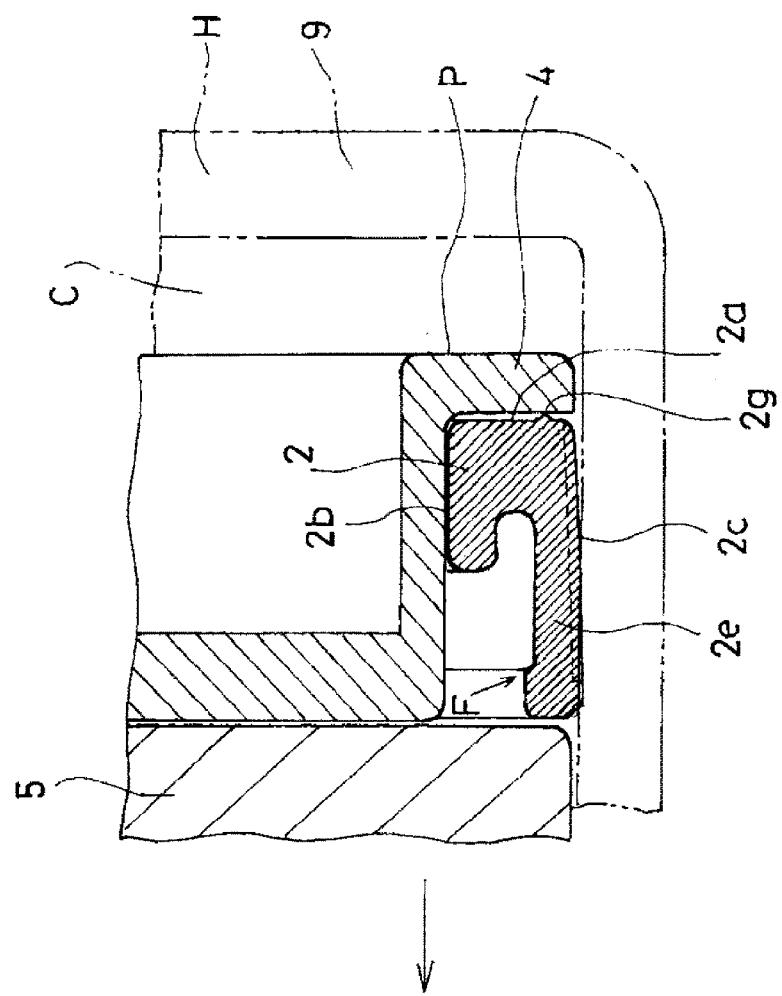
FIG. 13 is an enlarged cross-sectional structural view of the essential parts of the damper (a third example) according to another embodiment of the present invention, and shows a state when the piston moves forward.
Figure 14:
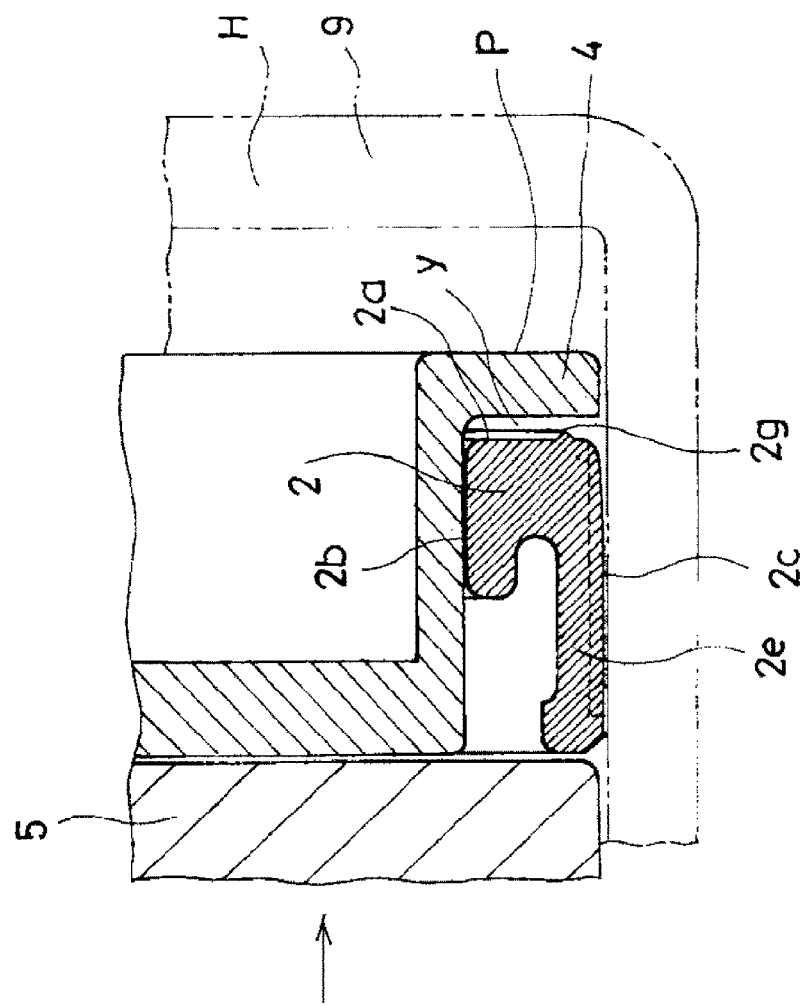
FIG. 14 is an enlarged cross-sectional structural view of the essential parts of the third example, and shows a state when the piston moves backward.

The damper of a third example shown in FIG. 13 and FIG. 14 has a structure that the piston P is not provided with the slider 3. The rest of the structures of the damper of the third example are substantially same as those of the damper of the first example so as to omit their explanations. Then, in the damper of the third example, the portion contacting the inner wall of the housing H in the seal member 2 deforms outwardly toward the housing H when the chamber C formed between the piston P and the blocking end 9 of the housing H has the negative pressure (FIG. 13). Namely, in the third example, when the piston P moves forward, the circumferential projection piece 2g formed on the front end face 2a of the seal member 2 is firmly attached to the first flange 4 so as to seal between the front end face 2a and the first flange 4, and since the inside of the chamber C has the negative pressure, due to a force applied to the skirt-shaped portion 2e and shown with the reference alphabet F in FIG. 13, the skirt-shaped portion 2e deforms outwardly to seal between the outer face 2c of the seal member 2 and the inner wall of the housing H (FIG. 13). Thereby, in the third example, when the piston P moves forward, the resistance due to the pressure change is generated. Also, the skirt-shaped portion 2e of the seal member 2 deforms outwardly so as to generate the frictional resistance. Even in the damper of the third example, in accordance with the operation speed of the piston P, the deformation amount of the seal member 2 increases.

All of each damper device explained above can easily generate the intended braking force even if the cross-sectional area of the housing H is made small as described above so as to have the flat and thin outer frame shape in the cross section of the housing in the direction orthogonally in the moving direction of the piston.

Incidentally, obviously, the present invention is not limited to the embodiments explained above, and the embodiments include all embodiments which can obtain the object of the present invention.

All contents of the specification, claims, drawings, and abstract of Japanese Patent Application No. 2013-262149 filed on Dec. 19, 2013 are cited in their entireties herein and are incorporated as a disclosure of the specification of the present invention.

What is claimed is:

1. A damper comprising:
   a piston including a rod; and
   a housing having an open end and storing the piston, the housing generating a braking force in cooperation with an operation of the piston,
   wherein the piston includes:
      a seal member having a skirt-shaped portion, extending toward the open end of the housing and contacting an inner wall of the housing to seal between the piston and the inner wall of the housing, and
      a slider provided slidably relative to the piston, and having an extension portion extending toward the open end of the housing and contacting the inner wall of the housing with a predetermined frictional force, the extension portion including a pressure contact portion formed at a base end thereof and pressing one end of the skirt-shaped portion to deform the skirt-shaped portion outwardly toward the inner wall of the housing when the braking force is generated,
   the seal member further includes a front end face portion facing a blocking end of the housing opposite to the open end thereof, an inner face portion extending from an inner side of the front end face portion toward the open end, and an outer face portion spaced from the inner face portion and extending from an outer side of the front end face portion toward the open end to form the skirt-shaped portion, the outer face portion having a length greater than that of the inner face portion to form a space inside the outer face portion,
   the skirt-shaped portion inclines outwardly in a direction toward the open end of the housing, and
   the seal member further includes a groove formed in the skirt-shaped portion, and having one groove end opened at the front end face portion and another groove end closed at the one end of the skirt-shaped portion such that the skirt-shaped portion deforms inwardly to form a ventilation passage between the inner wall of the housing and the skirt-shaped portion when the piston moves from the open end of the housing toward the blocking end thereof.

2. A damper according to claim 1, wherein the pressure contact portion presses the skirt-shaped portion from a rod side.

3. A damper according to claim 1, wherein in accordance with an operation speed of the piston, a deformation amount of the skirt-shaped portion increases.

4. A damper according to claim 1, wherein in accordance with an operation speed of the piston, a sliding amount of the slider increases.

5. A damper, comprising:
a piston provided with a rod, and
a housing having an open end and a blocking end opposite to the open end, and storing the piston, the housing generating a braking force in cooperation with an operation force of the piston,
wherein the piston includes a seal member having a skirt-shaped portion, extending toward the open end of the housing and contacting the inner wall of the housing to seal between the piston and the inner wall of the housing, the skirt-shaped portion deforming outwardly toward the inner wall of the housing when a chamber formed between the piston and the blocking end of the housing has a negative pressure,
the seal member further includes a front end face portion facing the blocking end of the housing opposite to the open end thereof, an inner face portion extending from an inner side of the front end face portion toward the open end, and an outer face portion spaced from the inner face portion and extending from an outer side of the front end face portion toward the open end to form the skirt-shaped portion, the outer face portion having a length greater than that of the inner face portion to form a space inside the outer face portion,
the skirt-shaped portion inclines outwardly in a direction toward the open end of the housing, and
the seal member further includes a groove formed in the skirt-shaped portion, and having one groove end opened at the front end face portion and another groove end closed at the one end of the skirt-shaped portion such that the skirt-shaped portion deforms inwardly to form a ventilation passage between the inner wall of the housing and the skirt-shaped portion when the piston moves from the open end of the housing toward the blocking end thereof.

6. A damper according to claim 5, wherein in accordance with an operation speed of the piston, a deformation amount of the skirt-shaped portion increases.

7. A damper according to claim 1, wherein an outer frame shape in a cross section of the housing in a direction orthogonal to a moving direction of the piston is made flat.

8. A damper comprising:
a piston including a rod; and
a housing having an open end and storing the piston, the housing generating a braking force in cooperation with an operation of the piston,
wherein the piston includes:
a seal member having a skirt-shaped portion, extending toward the open end of the housing and contacting an inner wall of the housing to seal between the piston and the inner wall of the housing, and
a slider provided slidably relative to the piston, and having an extension portion extending toward the open end of the housing and contacting the inner wall of the housing with a predetermined frictional force, the extension portion including a pressure contact portion formed at a base end thereof and pressing one end of the skirt-shaped portion to deform the skirt-shaped portion outwardly toward the inner wall of the housing when the braking force is generated,
the seal member further includes a front end face portion facing a blocking end of the housing opposite to the open end thereof, an inner face portion extending from an inner side of the front end face portion toward the open end, and an outer face portion spaced from the inner face portion and extending from an outer side of the front end face portion toward the open end to form the skirt-shaped portion, the outer face portion having a length greater than that of the inner face portion to form a space inside the outer face portion,
the skirt-shaped portion inclines outwardly in a direction toward the open end of the housing, and
the slider is disposed at a rear side of the seal member, and further includes a cylindrical base spaced from the inner face portion of the seal member, a base portion extending radially outwardly from the cylindrical base between a front end and a rear end of the cylindrical base, and a shoulder portion formed at the base portion as the pressure contact portion, the extension portion extending from the base portion at a side opposite to the shoulder portion and forming a space between the extension portion and the cylindrical base.

9. A damper according to claim 8, wherein the piston further includes a first flange portion and a second flange portion apart from each other to arrange the seal member and the slider therebetween, and
the seal member further includes a circumferential projection piece formed on the front end face portion and projecting toward the first flange portion to seal between the front end face portion of the seal member and the first flange portion when the braking force is generated.

* * * * *